Patented Feb. 8, 1944

2,340,934

UNITED STATES PATENT OFFICE 2,340,934

CONVERSION OF HYDROCARBON OILS

Gerald C. Connolly, Baton Rouge, La., assignor to Standard Oil Development Company, a corporation of Delaware No Drawing. Application August 31, 1940, Serial No. 354,913

1 Claim. (Cl. 196—52)

This invention relates to the catalytic conversion of hydrocarbon oils and pertains more particularly to a catalyst for cracking such oils.

It has heretofore been known that adsorbent contact materials consisting principally of silica and alumina, such as activated clays and silica-alumina gels, form active catalysts for the cracking of hydrocarbon oils. It is also know that contact materials consisting principally of silica and magnesia form active catalysts for cracking oils.

Silicia-alumina type catalysts have certain advantages over the silicia-megnesia type catalysts. For example, the silica-alumina catalysts are normally more stable and produce a gasoline having a higher octane number than that normally obtained from the silicia-magnesia type catalyst. On the other hand, the silica-magnesia catalysts for a given conversion into gasoline normally produce less degradation of the feed stock into low-grade products, such as gas and coke.

The object of the present invention is to provide a catalyst which will have the advantages of both types of catalysts previously described and which will not be subject to the disadvantages heretofore mentioned.

I have found that cracking catalysts containing both alumina and magnesia in conjunction with silica are capable not only of producing as high a yield of gasoline under a given set of conditions as either silica-alumina or silica-magnesia catalysts but that such yields can be obtained with less degradation of the oil into low-grade products, such as gas and coke, and without reducing the quality of the product.

To obtain these results the amount of silica present in the catalyst should be at least 50%. The amounts of magnesia and alumina present in the catalyst can vary over an extended range. It is preferable, however, to have the magnesium oxide present in substantial excess as compared with the amount of alumina. This exsess may amount to from five to ten times that of alumina. One particularly effective catalyst contains about 3% alumina, 30% magnesium oxide, and the balance silcia.

The mixed silica-megnesia-alumina catalyst forming the present invention may be made in a number of different ways.

One method found to be particularly effective is to separately form a silica-alumina gel and a silica-magnesia gel and to then mechanically mix the two products in powdered form in the proper proportions. For example, in preparing the silica-alumina gel, a silica hydrogel prepared according to conventional procedure may be impregnated with an aluminum nitrate solution of a concentration sufficient to give the desired alumina content to the product. This material is then dried and activated to decompose the nitrate. The silica-magnesia gel may be formed by mechanically mixing commercial magnesium oxide, preferably one of relatively high purity, with silica hydrogel in the proper proportions and thereafter drying the mixture. The resulting materials may then be mechanically mixed in the proper proportions to give the final product.

The catalyst may also be prepared by incorporating both the alumina and the magnesia into a single batch of silica gel or silica hydrogel such as by coprecipitating, homogenizing, and the like.

Effective catalysts of this type may also be formed by incorporating magnesium oxide into activated clays, or by incorporating alumina into activated magnesium silicates. In general, the resulting products should have a capillary adsorptive structure and it is preferred to employ synthetic gels containing these three components. The gel structure is preferably formed from the silica, and the alumina and magnesia components may be in the form of a gel although this is not essential.

It will be understood that the present invention is not restricted in its broader phases to any specific method of forming the catalyst.

To illustrate the advantages of the invention, the following examples are submitted, it being understood that the values and conditions are illustrative rather than limitive.

In each of the examples the activity of the catalyst and cracking characteristics thereof were determined by passing an East Texas gas oil of 33.8° A. P. I. gravity in vapor form through a reaction zone containing preformed catalyst pellets at a feed rate of 0.6 volumes of liquid oil per volume of catalyst per hour at a temperature of 850° F. over a two-hour period. The amount of gasoline obtained under these conditions and the amount of gas liberated were determined and in most cases the aniline point and the amount of aromatics and olefins present in the gasoline were determined in order to evaluate the quality of the product.

*Example 1*

A silica-alumina gel was prepared by soaking a washed hydrogel, (the dried gel of which had an apparent density of 0.73) with a solution of aluminum nitrate having a concentration sufficient to form a product having a molar ratio of silica to alumina of about 12.5 to 1. The soaking was continued until the hydrogel was thoroughly saturated, after which the product was drained and dried slowly at a temperature below 212° F. This product was then activated by slowly heating to 850° F. and maintaining the said temperature for an extended period amounting to about four hours. This product was then molded into pellets and tested under the above conditions. The results of this test are set forth in the table hereinafter.

through the separate layers in series. The results of such tests are shown in the accompanying table.

*Example 6*

80 parts of the catalyst described in Example 2 was placed in the bottom of the reaction chamber and 20 parts of the product described in Example 1 placed in the top of the reaction chamber, the flow of gases being the same in both Examples 5 and 6. The results of this test are shown in the following table:

|  | Example | | | | | |
|---|---|---|---|---|---|---|
|  | 1 | 2 | 3 | 4 | 5 | 6 |
| Catalyst | Si-Al | Si-Mg | Si-Al-Mg | Si-Al-Mg | Layer | Layer |
| Vol. percent gasoline | 50.0 | 54.5 | 57.0 | 57.0 | 53.0 | 53.0 |
| Wt., percent gas | 9.2 | 6.3 | 8.7 | 8.6 | 7.1 | 7.6 |
| Wt. ratio—gasoline: Gas | 3.97 | 7.01 | 4.86 | 4.89 | 5.80 | 5.53 |
| Gasoline analysis: Aniline point | 99 | 111. | 105 | | | |
| Vol., percent olefins | 26 | 24 | 27 | | | |
| Vol., percent aromatics | 30 | 21 | 26 | | | |

*Example 2*

A silica-magnesia gel was prepared by mechanically mixing the silica hydrogel of the type described in Example 1 with magnesium oxide so that the resulting product contained about 35% of the latter component. This product was then slowly dried and activated by heating to a temperature of about 1300° F. The resulting product was then ground and molded into pellets and tested under the above conditions. The results of the test are shown in the following table.

*Example 3*

20 parts of the product described in Example 1 in powdered form prior to molding was thoroughly mixed with 80 parts of the product described in Example 2. The resulting mixture was then molded into pellets and tested under the above conditions. The results of this test are shown in the table.

*Example 4*

40 parts of the product described in Example 1 were thoroughly mixed with 60 parts of the product described in Example 2 and the resulting mixture thereafter molded into pellets. These products were tested under the above-outlined conditions and the results of the test are given in the accompanying table.

*Example 5*

A further test was carried out in which 20 parts of the catalyst described in Example 1 was placed in the bottom of the reaction chamber and 80 parts of the product described in Example 2 was placed at the top of the reaction chamber and the oil to be cracked was passed downwardly It will be observed from a comparison of the results obtained from previous samples that a mechanical mixture of silica-alumina and silica-magnesia catalysts produces at least as high if not a higher yield of gasoline than that obtained by either of the two catalysts when used alone. Furthermore, the ratio of gasoline formed to the amount of gas formed when using the catalyst forming the present invention was materially higher than that obtained when employing the silica-alumina catalyst alone. From analyses of the gasoline obtained, it appears that the product produced by the catalyst forming my invention has a quality comparable to that obtained when silica-alumina gel catalysts are employed in the cracking operation.

Having described the preferred embodiment of the invention, it will be understood that it embraces other variations and modifications coming within the spirit and scope thereof.

I claim:

A method of cracking hydrocarbon oils which comprises passing the oil to be cracked while at cracking temperature in contact with a catalyst comprising silica, magnesia and alumina formed by first preparing a dry gel of silica and alumina and a dry gel of silica and magnesia, thereafter mixing the resulting gels in such proportions that the silica content of the catalyst is greater than the combined content of the alumina and magnesia and the magnesia content is greater than the alumina content, and maintaining the oil in contact with said catalyst for a period sufficient to obtain a substantial degree of cracking thereof into motor fuel constituents.

GERALD C. CONNOLLY.